(12) United States Patent
Ikeda et al.

(10) Patent No.: US 9,748,540 B2
(45) Date of Patent: Aug. 29, 2017

(54) POWER SUPPLY APPARATUS

(71) Applicant: Yazaki Corporation, Minato-ku, Tokyo (JP)

(72) Inventors: Tomohiro Ikeda, Kakegawa (JP); Daiki Nagata, Kakegawa (JP)

(73) Assignee: YAZAKI CORPORATION, Minato-ku, Tokyo (JP)

(*) Notice: Subject to any disclaimer, the term of this patent is extended or adjusted under 35 U.S.C. 154(b) by 0 days.

(21) Appl. No.: 14/847,209

(22) Filed: Sep. 8, 2015

(65) Prior Publication Data

US 2015/0380699 A1    Dec. 31, 2015

Related U.S. Application Data

(63) Continuation of application No. PCT/JP2014/056421, filed on Mar. 12, 2014.

(30) Foreign Application Priority Data

Mar. 13, 2013 (JP) ................. 2013-050070

(51) Int. Cl.
| | |
|---|---|
| *H01M 10/052* | (2010.01) |
| *H01M 2/10* | (2006.01) |
| *H01M 2/34* | (2006.01) |
| *H01M 2/20* | (2006.01) |

(52) U.S. Cl.
CPC ......... *H01M 2/1077* (2013.01); *H01M 2/206* (2013.01); *H01M 2/34* (2013.01); *H01M 2220/20* (2013.01)

(58) Field of Classification Search
CPC .......................... H01M 10/482; H01M 10/425
See application file for complete search history.

(56) References Cited

U.S. PATENT DOCUMENTS

| | | |
|---|---|---|
| 2010/0190050 A1 | 7/2010 | Ochi |
| 2011/0024205 A1 | 2/2011 | Nishihara et al. |
| 2012/0328920 A1* | 12/2012 | Takase ............... H01M 2/1077 |
| | | 429/90 |

FOREIGN PATENT DOCUMENTS

| | | |
|---|---|---|
| JP | 2010-113888 A | 5/2010 |
| JP | 2010-114025 A | 5/2010 |
| JP | 2010-176997 A | 8/2010 |

(Continued)

OTHER PUBLICATIONS

International Search Report for PCT/JP2014/056421 dated Apr. 8, 2014 [PCT/ISA/210].

(Continued)

*Primary Examiner* — Olatunji Godo
(74) *Attorney, Agent, or Firm* — Sughrue Mion, PLLC (57) ABSTRACT

The present invention aims to provide a power supply apparatus capable of suppressing a short circuit that occurs between adjacent battery cells.

The power supply apparatus includes: a plurality of battery cells in which positive electrodes and negative electrodes are provided alternately and inversely with each other; a plurality of bus bars arranged in a straight line so as to series-connect the plurality of battery cells; a sheet-like insulation film disposed on at least one surface side of the plurality of bus bars; and a resin frame for fixing the plurality of battery cells, wherein an insulation portion for insulating the adjacent battery cells from each other is provided on the insulation film or in the resin frame.

9 Claims, 6 Drawing Sheets

(56) References Cited

FOREIGN PATENT DOCUMENTS

| | | | |
|---|---|---|---|
| JP | 2010-287550 | A | 12/2010 |
| JP | 2011-049158 | A | 3/2011 |
| JP | 2011-210710 | A | 10/2011 |
| JP | 2012-190678 | A | 10/2012 |
| JP | 2013-073917 | A | 4/2013 |

OTHER PUBLICATIONS

Written Opinion for PCT/JP2014/056421 dated Apr. 8, 2014 [PCT/ISA/237].

* cited by examiner

POWER SUPPLY APPARATUS

CROSS REFERENCE TO RELATED APPLICATIONS

This application is a Continuation Entry of Application No. PCT/JP2014/056421 filed Mar. 12, 2014, claiming priority based on Japanese Patent Application No. 2013-050070 filed Mar. 13, 2013, the contents of all which are incorporated herein by reference in their entirety.

TECHNICAL FIELD

The present invention relates to a power supply apparatus, in particular, relates to a power supply apparatus in which a plurality of battery cells is series-connected.

BACKGROUND ART

For example, an electric vehicle powered by an electric motor and a hybrid electric vehicle powered by a combustion engine and an electric motor mount the aforementioned power supply apparatus as a source for driving the electric motor. This power supply apparatus is provided with the bus bar module for series-connecting a plurality of battery cells (see the patent literature PTL 1).

Figure 6:
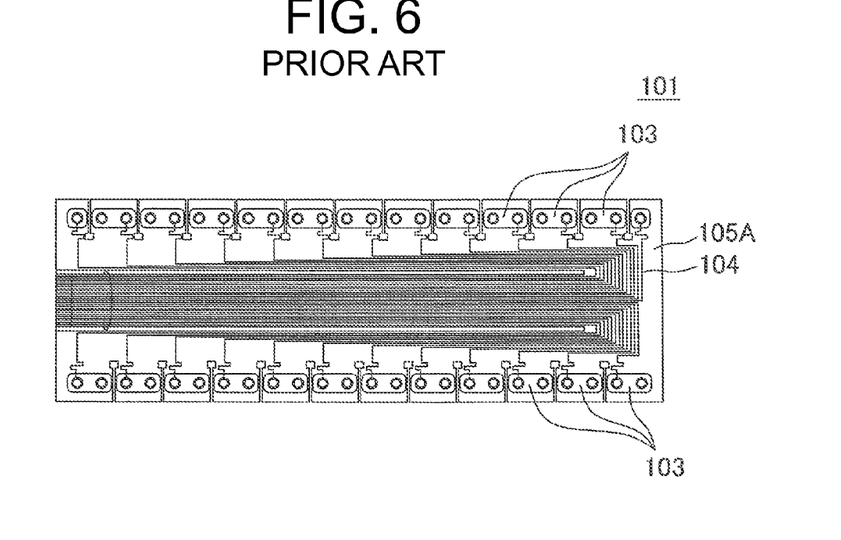
FIG. 6 is a plan view showing a conventional bus bar module.

The aforementioned conventional bus bar module, as illustrated in FIG. 6, is attached to the battery cell assembly fabricated by alternately and inversely stacking the battery cells each having a positive terminal at one end, and a negative terminal at the other end, and series-connects the battery cells being mutually stacked. The conventional bus bar module is configured to include a plurality of bus bars 103 arranged linearly in two rows so as to connect the plurality of battery cells in series-connection, a wiring-pattern portion 104 connected to each of the bus bars 103 and detecting a voltage of the each of the battery cells, a pair of insulative upper and lower films 105A and 105B (see FIG. 7) clamping the bus bars 103 arranged in two rows therebetween, and the wiring-pattern portion 104. FIG. 6 is a plan view of a conventional bus bar module 101, while FIG. 7 is an exploded perspective view of the conventional bus bar module shown in FIG. 6.

Figure 7:
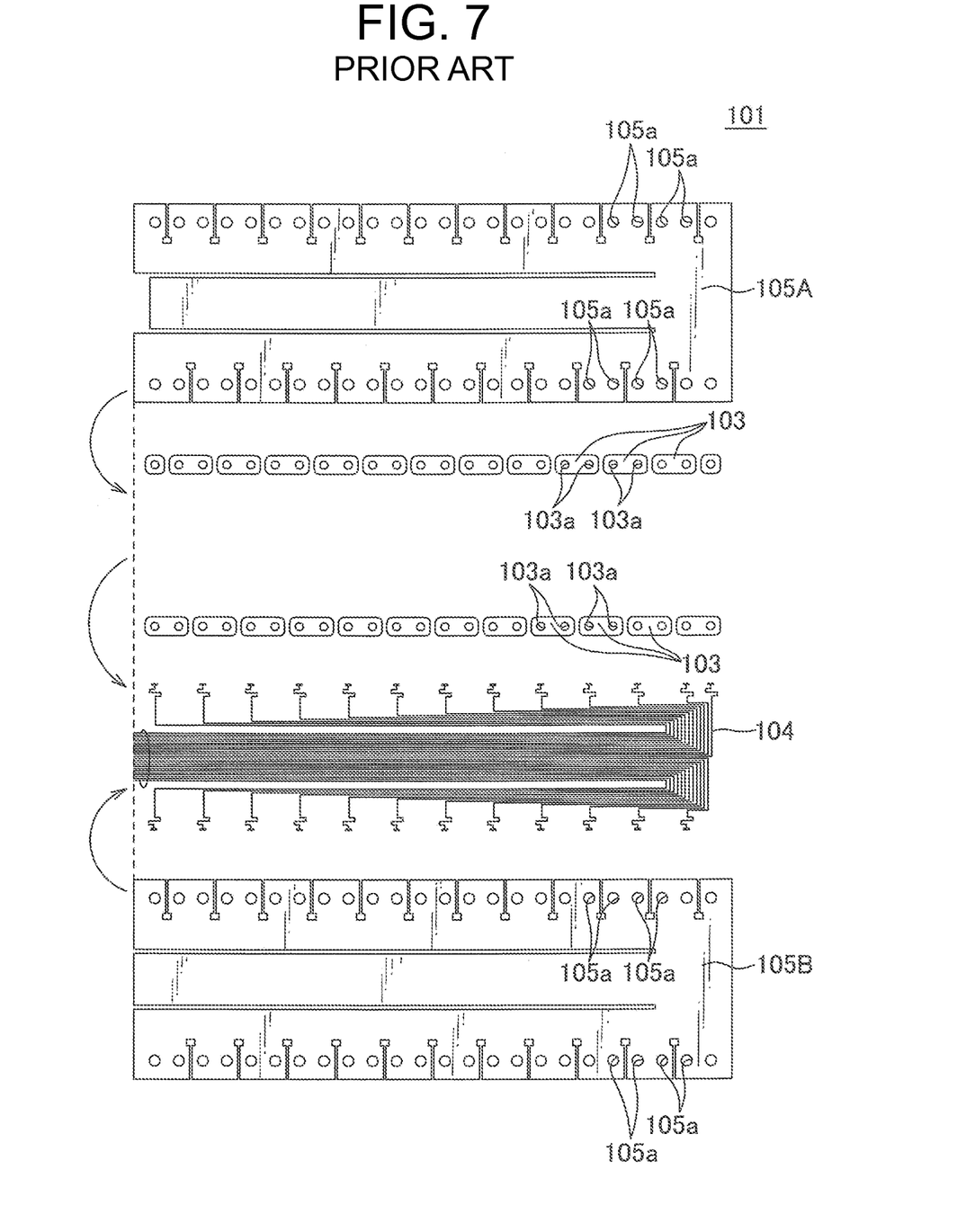
FIG. 7 is an exploded perspective view showing the bus bar module illustrated in FIG. 6.

Each of the bus bars 103, as also illustrated in FIG. 7, is formed in a rectangular plate-like shape and configured to be formed having two insertion holes 103a into which terminals of the adjacent battery cells are inserted. The wiring-pattern portion 104 is configured to include a cupper foil being formed in a predetermined pattern on the one film 105A of the upper and lower films 105A and 105B. Through the upper and lower films 105A and 105B, a pair of communication holes 105a is formed at a location overlapping with the pair of insertion holes 103a of each bus bar 103.

Such a bus bar module 101 is integrally assembled in a state clamping the bus bars 103 and the wiring-pattern portion 104 by putting a vacuum press apparatus in operation between the upper and lower films 105A and 105B that are transparent resin films.

The bus bar module 101 thus assembled is brought to be attached to the battery cell assembly such that a plurality of nuts (not shown) is screwed with a terminal of each battery cell, in a state where being approximated to the upper surface of the battery cell assembly, and the terminals of the battery cells being inserted into the insertion holes 103a of the bus bars 103 and the communication hole 105a of the upper and lower films 105A and 105B to overlap with the upper surface of the battery cell assembly, to have each bus bar 103 electronically and mutually connect terminals of adjacent battery cells.

CITATION LIST

Patent Literature

PTL 1: JP 2012-190678 A

SUMMARY OF INVENTION

Technical Problem

Such a conventional power supply apparatus comprised of the bus bar module 101 has a problem in that when foreign objects intrudes over between the terminals of the adjacent battery cells, a short circuit is caused between the adjacent battery cells. Further, since the power supply apparatus was integrally assembled in a state where the bus bars 103 and the wiring-pattern portion 104 are clamped between the upper and lower films 105A and 105B by using a vacuum press apparatus, a cost for purchasing the vacuum press apparatus and a place for an operation of the vacuum press apparatus were required and the cost for manufacturing the power supply apparatus was raised.

The present invention aims to provide a power supply apparatus capable of suppressing a short circuit that occurs between the adjacent battery cells.

Solution to Problem

One aspect of the present invention is a power supply apparatus including: a plurality of battery cells in which positive electrodes and negative electrodes are provided alternately and inversely with each other; a plurality of bus bars arranged in a straight line so as to series-connect the plurality of battery cells; a sheet-like insulation film disposed on at least one surface side of the plurality of bus bars; and a resin frame for fixing the plurality of battery cells, wherein an insulation portion for insulating adjacent battery cells from each other is provided on the insulation film or in the resin frame.

A first preferred aspect of the present invention is the power supply apparatus according to the one aspect of the present invention, wherein a columnar terminal is provided in each of the battery cells, the insulation portion provided in the resin frame is provided in a manner standing in a plate-like shape from between adjacent bus bars, and a tip of the insulation portion in the standing direction is positioned higher than a top portion of the terminal, and a width size of the insulation portion in a direction intersecting with an arrangement direction of the bus bars is formed greater than an external diameter size of the terminal.

A second preferred aspect of the present invention is the power supply apparatus according to the one aspect of the present invention, wherein a columnar terminal is provided in each of the battery cells, the insulation portion provided in the insulation film is a part of the insulation film, and the insulation portion is provided in a manner standing in a plate-like shape from between adjacent bus bars by a continued continuation portion of the insulation film being folded, and a tip of the insulation portion in the standing direction is positioned higher than a top portion of the terminal, and a width size of the insulation portion in a direction intersecting with an arrangement direction of the bus bars is formed greater than an external diameter size of the bus bar.

A third preferred aspect of the present invention is the power supply apparatus according to any one of the one aspect through the second preferred aspect of the present invention, wherein the insulation film is configured with a stretchable synthetic resin.

A fourth preferred aspect of the present invention is the power supply apparatus according to any one of the one aspect through the third preferred aspect of the present invention, wherein the plurality of bus bars is affixed to the insulation film via an adhesion layer.

Advantageous Effects of Invention

According to the one aspect of the present invention, since the power supply apparatus includes the resin frame for fixing the plurality of battery cells, and the insulation portion for insulating adjacent battery cells from each other is provided on the insulation film or in the resin frame, the insulation portion enables preventing foreign objects from intruding between the terminals of the battery cells located adjacent to each other at the adjacent bus bars side, thereby a short-circuit occurring between the adjacent battery cells can be prevented.

According to the first preferred aspect of the present invention, since the insulation portion provided in the resin frame is provided in a manner standing in a plate-like shape from between the adjacent bus bars, and the tip of the insulation portion in the standing direction is positioned higher than the top portion of the terminal, and the width size of the insulation portion in a direction intersecting with the arrangement direction of the bus bars is formed greater than the external diameter size of the terminal, the insulation portion enables preventing foreign objects from intruding between the terminals of the battery cells located adjacent to each other at the adjacent bus bars side.

Further, in a state where the power supply apparatus having been assembled, when the insulation film is provided closer to the battery cells side than the bus bars and the surface of the bus bar are exposed, it is preferable for the insulation portion provided in the resin frame that the width size of the insulation portion in a direction intersecting with the arrangement direction of the bus bars is made greater than the width size of the bus bar. By being formed in this way, the insulation portion ensures to prevent foreign objects from intruding between the adjacent bus bars.

According to the second preferred aspect of the present invention, since the insulation portion on the insulation film is provided in a manner standing in a plate-like shape from between the adjacent bus bars by a continued continuation portion of the insulation film being folded and stuck together at a portion of the insulation film, the insulation portion provided on the insulation film can be shape-formed by folding and sticking together the continuation portion without providing a new member, and since the tip of the insulation portion in the standing direction is positioned higher than the top portion of the terminal, and the width size of the insulation portion in a direction intersecting with the arrangement direction of the bus bars is greater than the width size of the bus bar, foreign objects are assuredly prevented from intruding between the bus bars and a short-circuit occurring between the adjacent battery cells can therefore be prevented.

According to the third preferred aspect of the present invention, the insulation film is configured with a stretchable synthetic resin. Since the plurality of battery cells configuring the battery cell assembly is affixed by the resin frame provided at both sides of each battery cell, when the interval between the adjacent battery cells is fluctuated due to an accidental error within the range of tolerable size of the resin frame, the insulation film shrinks in a manner following the fluctuation of interval of the terminals so that the intervals of the terminals, that is, the intervals of the adjacent bus bars are adjusted, thereby the bus bars disposed at the insulation film can be smoothly connected to the terminals.

According to the fourth preferred aspect of the present invention, since the plurality of bus bars is affixed to the insulation film via the adhesion layer, the plurality of bus bars can be connected to the insulation film without using a vacuum press apparatus unlike the conventional art, thereby the manufacturing cost of the power supply apparatus can be reduced by eliminating the use of the vacuum press apparatus.

DESCRIPTION OF EMBODIMENTS

Hereinafter, the power supply apparatus of one embodiment of the present invention is explained with reference to FIG. 1 through FIG. 4.

The power supply apparatus of the present invention is configured with a battery cell assembly 2 and a pair of bus bar modules 10 to be attached to the upper surface of the battery cell assembly 2. This power supply apparatus 1 is mounted on an electric vehicle driven by utilizing an electric motor, a hybrid motor vehicle driven by utilizing a combustion engine as well as an electric motor or the like, and is adapted to supply electric power to the electric motor.

Figure 1:
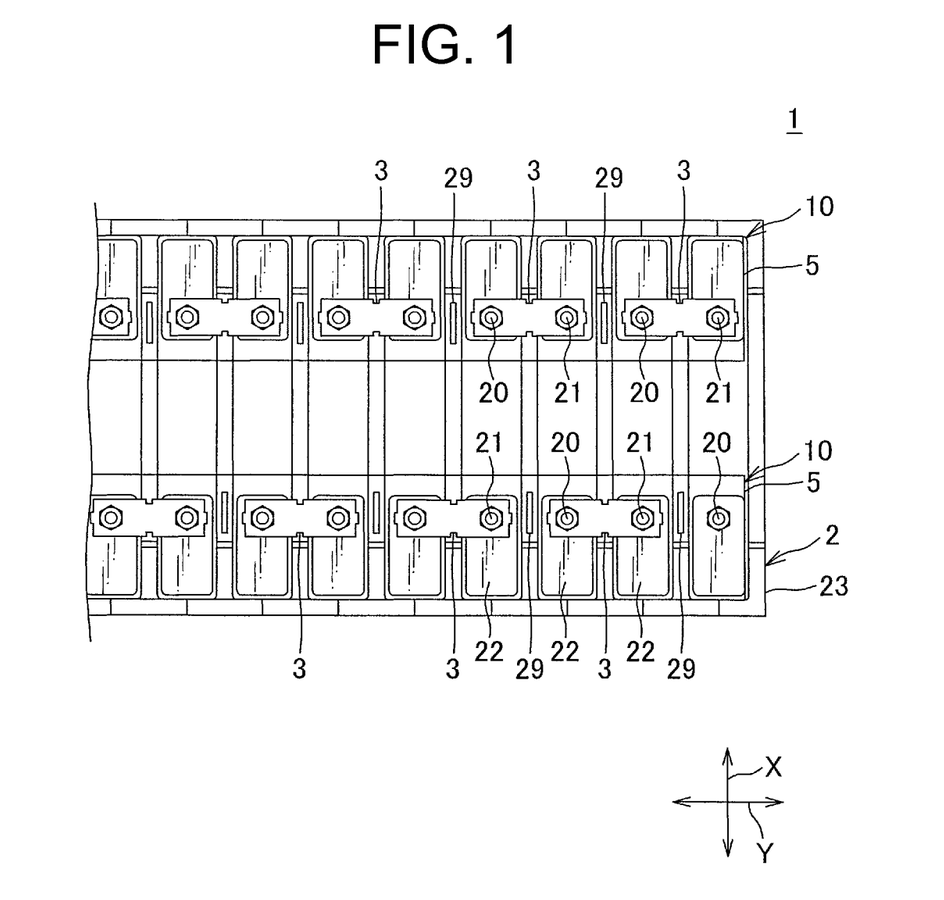
FIG. 1 is a plan view showing a power supply apparatus of one embodiment of the present invention.
Figure 2:
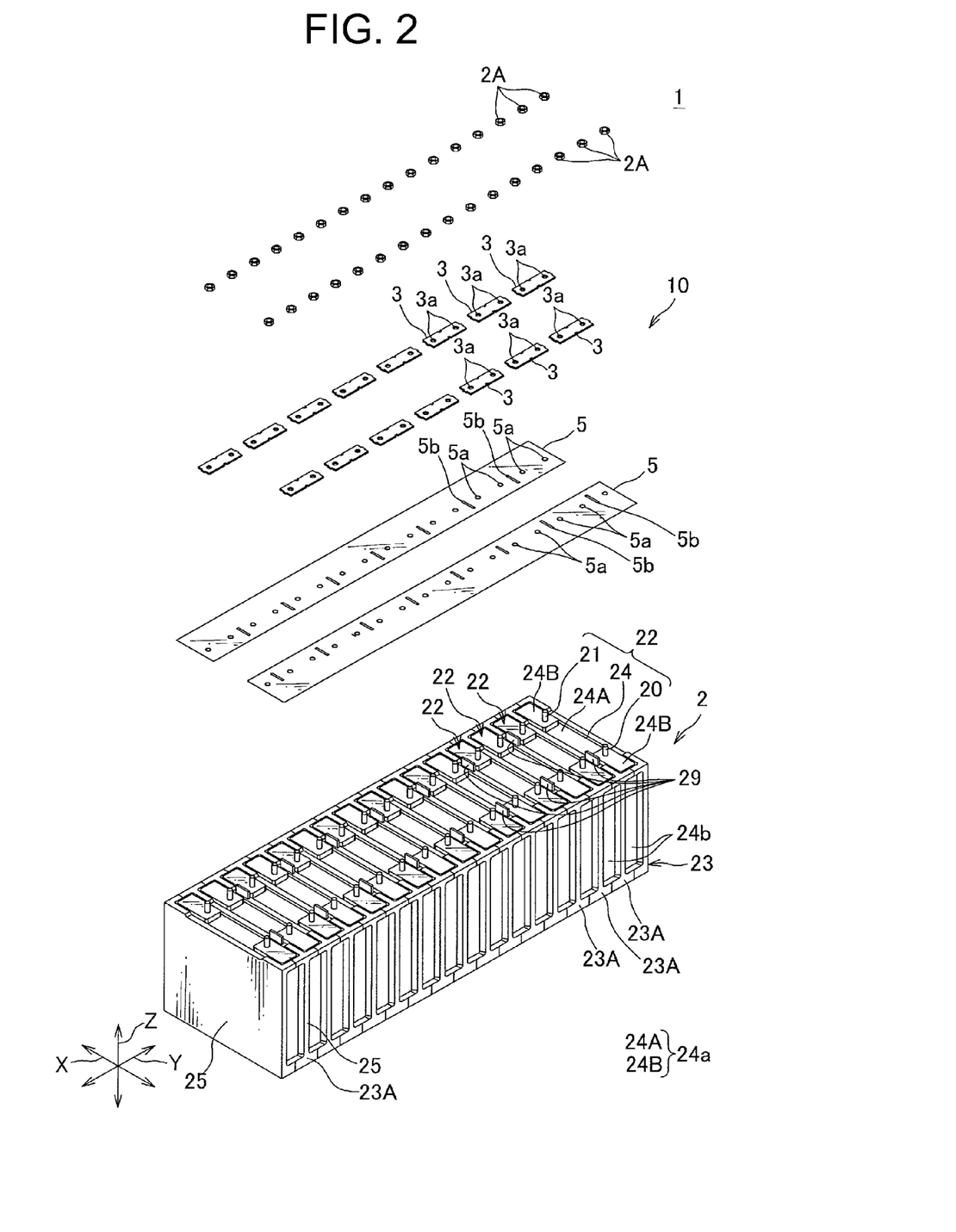
FIG. 2 is an exploded perspective view of a bus bar module configuring the power supply apparatus illustrated in FIG. 1.

The battery cell assembly 2 is comprised of, as illustrated in FIG. 2, a plurality of battery cells 22 in which positive electrodes 20 and negative electrodes 21 are alternately and inversely arranged with each other in a straight line, and a fixed frame 23 (a resin frame) being provided between adjacent battery cells 22 and fixing these battery cells 22 in a manner arranged. Herein, the arrow Y in FIG. 1 indicates an arrangement direction of the battery cells 22, the arrangement direction of the bus bars 3 (this will be discussed later), and a longitudinal direction of the bus bar module 10. The arrow X indicates a width direction of the bus bar module 10. The arrow Z indicates a height direction of each battery cell 22, that is, a height direction of the power supply apparatus 1.

Each battery cell 22 is comprised of, as illustrated in FIG. 2, a battery cell body 24 filled with electrolyte inside of a housing of the battery cell body 24 in a rectangular box shape, and the positive electrode 20 (corresponding to the terminals of the aspects of the present invention) and the negative electrode 21 (corresponding to the terminals of the aspects of the present invention) respectively protruding from both ends of the upper surface of the battery cell body 24 in the longitudinal direction X. The battery cell body 24 is configured with an upper surface 24a and a lower surface in the direction of the arrow Z, both side surfaces respectively continuing to both peripheries of the upper surface 24a and the lower surface in a width direction (in the direction of the arrow Y), and both side surfaces 24b respectively continuing to both peripheries of the upper surface 24a and the lower surface in a longitudinal direction (in the direction of the arrow X). The upper surface 24a of this battery cell body 24 is configured with a flat portion 24A provided at a central portion of the upper surface 24a in the longitudinal direction (in the direction of the arrow X), and stage portions 24B being provided at both ends of the upper surface 24a in the longitudinal direction, which are slightly higher than the flat portion 24A. At an end portion of this stage portion 24B at the flat portion 24A side, there is provided the positive electrode 20 or the negative electrode 21. The positive electrode 20 and the negative electrode 21 are each configured by a metal having electrical conductivity, and are formed in a columnar shape respectively. At the outer peripheral surfaces of the positive electrode 20 and the negative electrode 21, there are formed screw grooves which screw together with nuts 2A.

Figure 3:
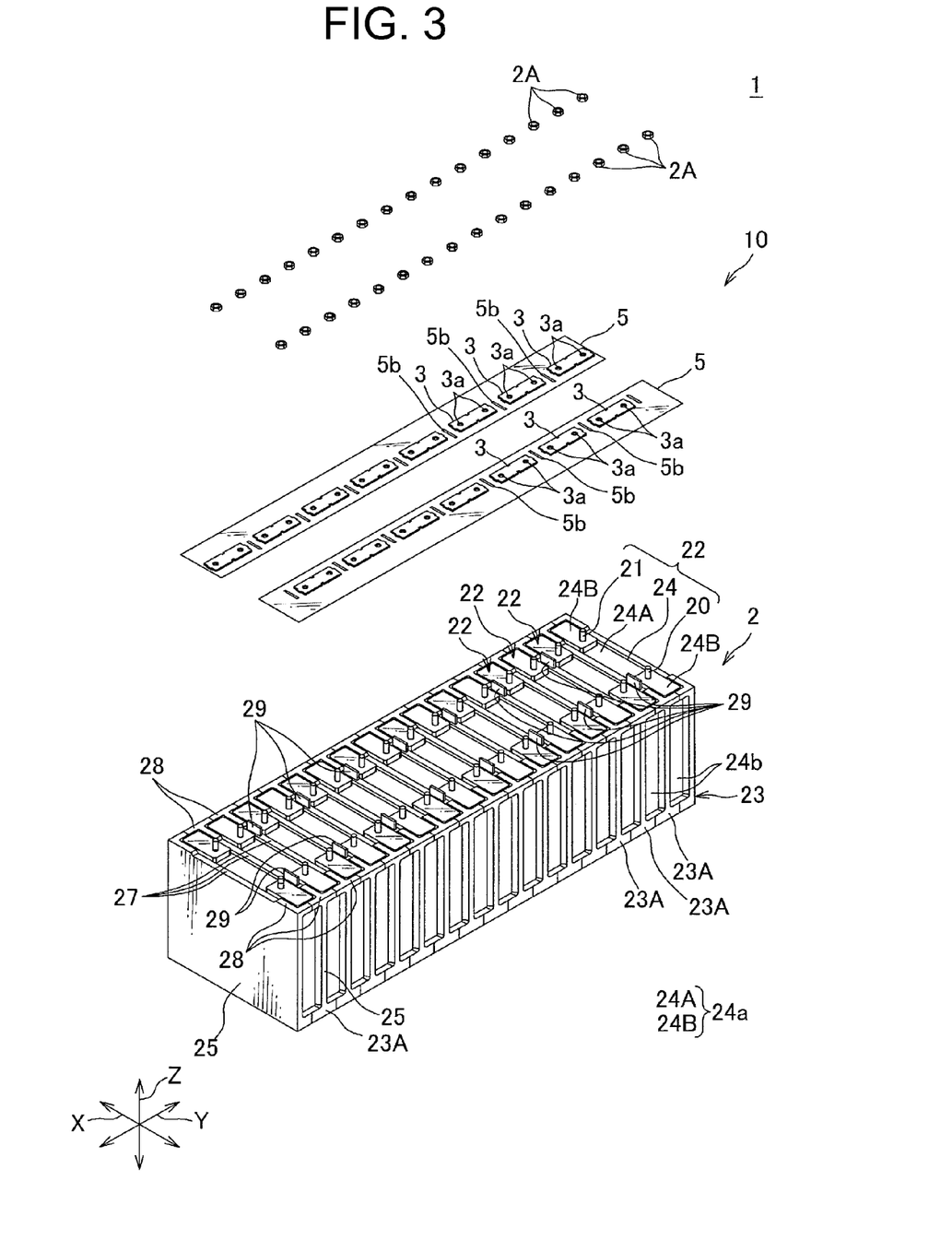
FIG. 3 is a perspective view showing an assembling process of the power supply apparatus illustrated in FIG. 1.

The fixed frame 23 is configured with, as illustrated in FIG. 2, frame portions 23A being provided alternately with the battery cells 22 between the adjacent battery cells 22 and being coupled with each other to arrange and fix the battery cells 22. Each frame 23A is comprised of a side-plate portion 25 stacked to a side surface of the battery cell body 24 in the direction of the arrow Y, and a coupling portion 26 being formed in a manner protruding in a pillar-like shape in the arrangement direction (in the direction of the arrow Y) of the battery cells 22 from both ends of upper and lower locations (in the direction of the arrow Z) of the side-plate portion 25 and being coupled to each other above the side-surface 24b of the battery cell body 24. The upper surface of each frame portion 23A is configured with, as illustrated in FIGS. 3 and 4, a base portion 27 provided at a central portion on the upper surface of the side-plate portion 25 in the direction of the arrow X, both end portions of the upper surface of the side-plate portion 25 in the longitudinal direction, and a step portion 28 provided at the coupling portion 26, a height of the step portion 28 being slightly higher than that of the base portion 27.

Figure 4:
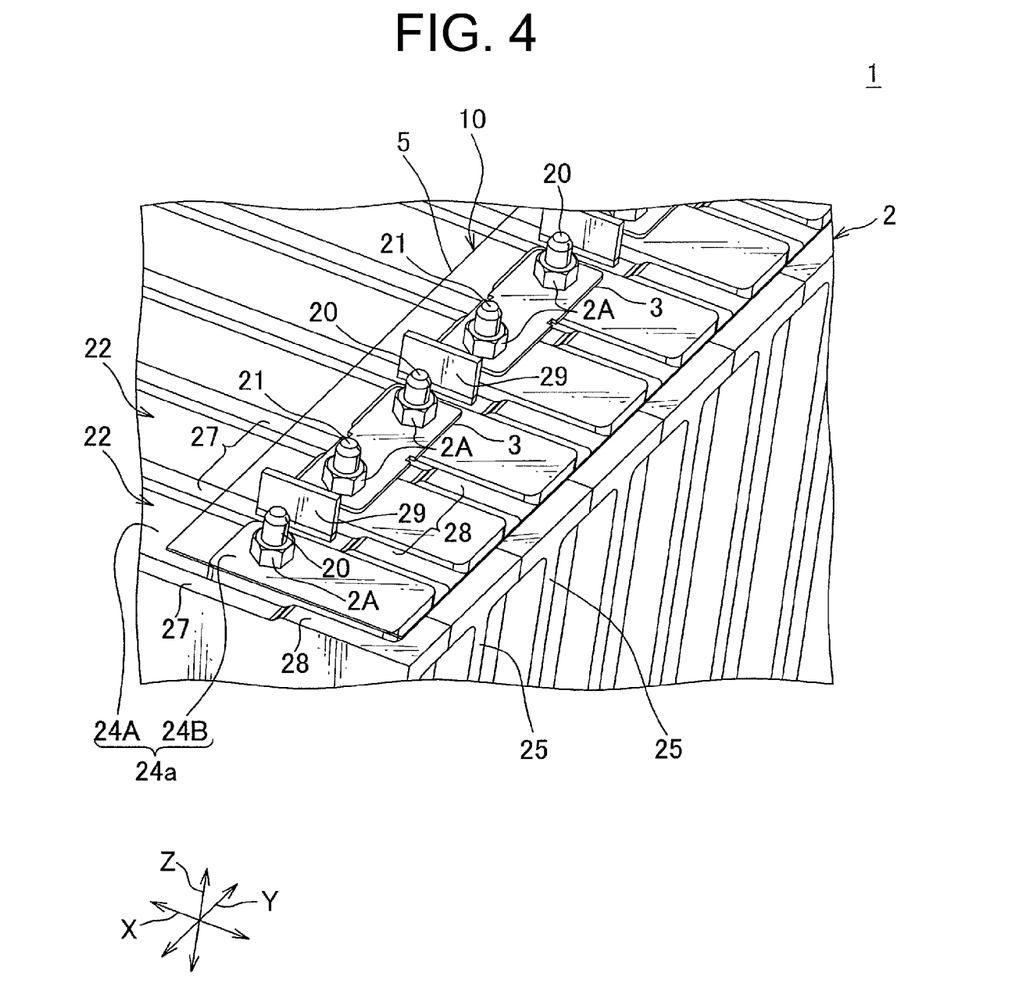
FIG. 4 is a perspective view showing a partial enlarged view of the power supply apparatus illustrated in FIG. 1.

The base portion 27 is formed so as to be slightly higher than the flat portion 24A of the battery cell body 24, as illustrated in FIG. 4. The base portion 27 is provided with, at both ends of the base portion 27 in the direction of the arrow X, an insulation portion 29 for insulating the adjacent bus bars 3 from each other, the adjacent bus bars 3 being connected to the terminals 20 and 21.

The insulation portion 29 is formed so as to stand in a rectangular plate-like shape from the base portion 27 as illustrated in FIG. 4. This insulation portion 29 is formed such that the longitudinal direction thereof is in the same direction as the direction of the arrow X, the width direction thereof is in the same direction as the direction of the arrow Z, and a plate-thickness direction thereof is in the same direction as the direction of the arrow Y. In FIG. 4, the insulation portion 29 is provided, between the terminals 20 and 21 which are mutually different, at one side of the negative electrode 21 of the battery cell 22 in the direction of the arrow Y (at the front side in the direction of the arrow Y in FIG. 4) and the other side of the positive electrode 20 of the battery cells 22. The insulation portion 29 is formed such that an upper end (the tip in the standing direction) thereof is higher than those of the terminals 20 and 21, and the longitudinal size (in the direction of the arrow X) thereof is greater than the external diameter of the nuts 2A screwed with the terminals 20 and 21, and both end portions of the insulation portion 29 in a longitudinal direction are positioned at the outside of both end portions of the nut 2A in the direction of the arrow X. More preferably, the insulation portion 29 is formed such that the upper end thereof is higher than the top portions of the terminals 20 and 21, a longitudinal size thereof is greater than the width size (in the direction of the arrow X) of the bus bars 3 connected to the terminals 20 and 21, and both end portions of the insulation portion 29 in a longitudinal direction are located at the outside of both end portions of the bus bars 3 connected to the terminals 20 and 21 in the direction of the arrow X.

Each bus bar module 10, being attached to the upper surface of the battery cell assembly 2, is adapted to series-connect the aforementioned plurality of battery cells 22. Each bus bar module 10 is comprised of, as illustrated in FIG. 1, the bus bars 3 which series-connect the battery cells 22 by connecting the positive electrode 20 and the negative electrode 21 of the adjacent battery cells 22, a connection body (not illustrated in figures) electrically connected to each of the bus bars 3, and a sheet-like shaped insulation film 5 on which one surface of the bus bar 3 is disposed. The connection body is composed of a plurality of electrical wires, and each electrical wire is provided so as to detect voltage of each battery cell 22, in a state where one end of each electrical wire being connected to the bus bar 3 and the other end of each electrical wire being connected to a voltage detection portion (not illustrated).

The plurality of bus bars 3 is respectively obtained from a metal plate worked by using a press or the like, and is configured, as illustrated in FIGS. 2 and 3, such that a pair of terminal insertion holes 3a is formed through a metal plate, the positive electrode 20 and the negative electrode 21 of the adjacent battery cells 22 being inserted into the terminal insertion holes 3a. Each bus bar 3 is affixed and electrically connected, by the nuts 2A (see FIG. 2 etc.) being screwed with the positive electrode 20 and the negative electrode 21, to the positive electrode 20 and the negative electrode 21 which are screwed into the pair of terminal insertion holes 3a.

The insulation film 5 is configured by a synthetic resin having insulation and stretching properties, and is formed in a rectangular-shaped sheet. This insulation film 5 is formed such that the longitudinal size thereof (in the direction of the arrow Y) is substantially equal to the longitudinal size of the battery cell assembly 2 at the upper surface of the battery cell assembly 2, the width size (in the direction of the arrow X) of the insulation film 5 is greater than the size of the stage portion 24B of the battery cell 22 in the direction of the arrow X, and the insulation film 5 is capable of covering the entire regions of the stage portions 24B of all the battery cells 22. Through this insulation film 5, there are formed each pair of terminal insertion holes 5a being inserted into by each of the terminal 20 and 21 of each battery cell 22 in a manner communicating with each pair of terminal insertion holes 3a of the bus bars 3, and an insulation insertion hole 5b being inserted into by the insulation portion 29 provided in the fixed frame 23.

Further, this insulation film 5 is configured to have an adhesion property (an adhesion layer not illustrated), and each bus bar 3 is affixed to a predetermined location on the insulation film 5 via this adhesion layer.

Next, an assembling procedure of the bus bar module 10 is explained. After having fabricated the bus bars 3 and the insulation film 5, the bus bar 3 is placed on one surface on the insulation film 5, in a state where each pair of terminal insertion holes 3a of the bus bar 3 is approximated to each pair of terminal insertion holes 5a on the one surface of the insulation film 5, and the holes 3a and 5a are communicated with each other. Since the insulation film 5 is configured to have an adhesion property (the adhesion layer), each bus bar 3 is affixed to a predetermined location on the insulation film 5 via this adhesion layer. Subsequently, a connection body is electrically connected to each bus bar 3. In this way, the bus bar module 10 is made assembled.

Next, an assembling procedure of the power supply apparatus 1 are explained with reference to FIGS. 3 and 4. As illustrated in FIG. 3, one end portion of the bus bar module 10 assembled by the aforementioned procedure in a longitudinal direction (in the direction of the arrow Y) is approximated to one end of the upper surface of the battery cell assembly 2 in a posture where the bus bars 3 of the bus bar module 10 are positioned higher than the insulation film 5. Next, as illustrated in FIG. 4, the insertion holes 3a and 5a at the one end portion of the bus bar module 10 are inserted into by the terminal 20 at the one end portion of the battery cell assembly 2, and the insulation insertion hole 5b at the other end side of the bus bar module 10 is inserted into by the insulation portion 29 at the other end side of the terminal 20 of the one end portion of the battery cell assembly 2, thereby the bus bar module 10 is brought to be laid over the upper surface of the battery cell assembly 2. At this time, since the fixed frame 23 is configured with a synthetic resin, even if the interval between the terminals 20 and 21 of the adjacent battery cells 22 is fluctuated, due to a stretching movement of the insulation film 5 that follows the fluctuation of interval between the terminals 20 and 21, the bus bar module 10 is capable of being lapped over the upper surface of the battery cell assembly 2. In this state, the nuts 2A are screwed with the terminals 20 and 21, and the bus bar module 10 is affixed to the battery cell assembly 2, thereby the power supply apparatus 1 is made assembled.

According to the power supply apparatus 1 thus assembled, since the insulation portion 29 provided in the fixed frame 23 is provided in a manner standing in a plate-like shape from between the adjacent bus bars 3, and the tip of the insulation portion 29 in the standing direction (in the direction of the arrow Z) is positioned higher than the top portions of the terminals 20 and 21, and the width size of the insulation portion 29 in a direction intersecting the arrangement direction of these bus bars 3 is formed greater than the external diameter size of the terminals 20 and 21, the insulation portion 29 enables preventing foreign objects from intruding between the terminals 20 and 21 of the battery cells 22 located adjacent to each other at the adjacent bus bars 3 side.

Further, like the power supply apparatus 1 as the above described, in a case where the insulation film 5 is provided closer to the battery cells 22 side than the bus bars 3 and the surfaces of the bus bars 3 are exposed, it is preferable for the insulation portion 29 provided in the fixed frame 23 (the resin frame) that the width size of the insulation portion 29 in a direction intersecting the arrangement direction of the bus bars 3 is made greater than the width size of the bus bars 3. By forming in this way, the insulation portion 29 ensures to prevent foreign objects from intruding between the adjacent bus bars 3 and a short-circuit occurring between the adjacent battery cells can be prevented.

Figure 5:
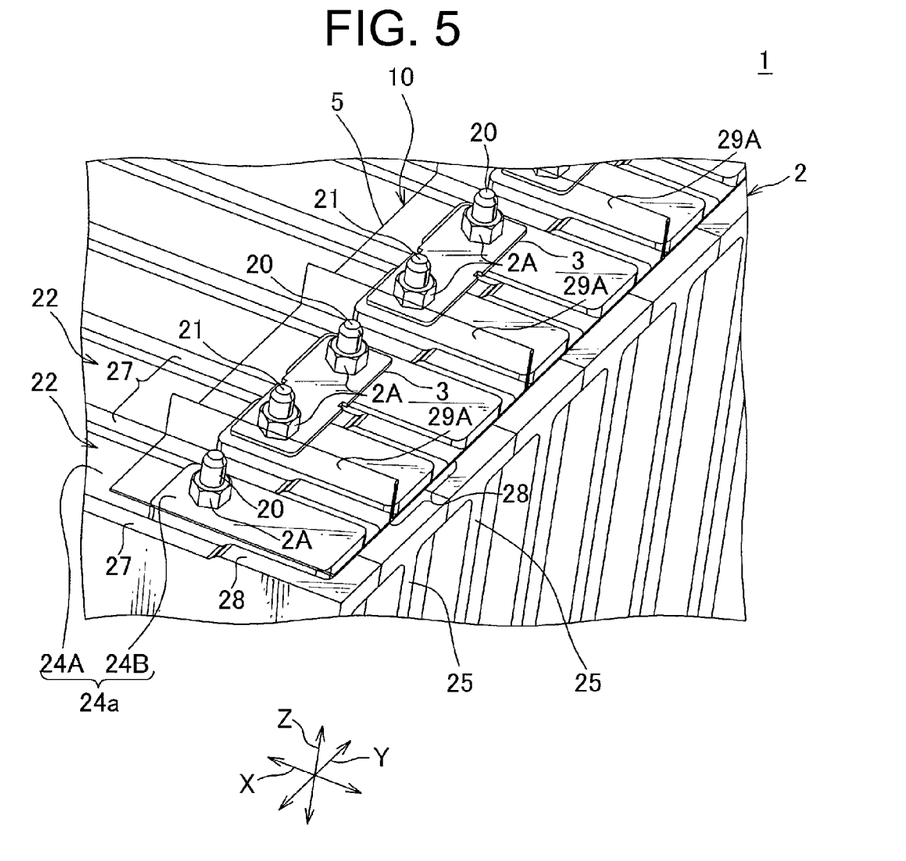
FIG. 5 is a perspective view showing one variant of the power supply apparatus illustrated in FIG. 4.

Incidentally, in the aforementioned embodiment, although the insulation portion 29 is formed in the fixed frame 23, the present invention is not limited thereto, an insulation portion 29A may be formed in the insulation film 5 instead of the insulation portion 29 being formed in the fixed frame 23. In this case, the insulation portion 29A, as illustrated in FIG. 5, may be formed in a manner standing in a plate-like shape from between the adjacent bus bars 3 by folding and sticking together a continuation portion continued at a portion of the insulation film 5. It is preferable that the both ends of the insulation portion 29A in the width direction are positioned at the outside of both ends of the bus bars 3 connected to the terminals 20 and 21 in the direction of the arrow X, the top portion of the insulation portion 29A is positioned higher than the top portions of the terminals 20 and 21 and the width size of the top portion of the insulation portion 29A is made wider than the width size of the bus bar 3 (in the direction of the arrow X).

Further, in the aforementioned embodiment, although the bus bar 3 is attached to the battery cell assembly 2 in a state upwardly positioned from the insulation film 5, the present invention is not limited thereto, the insulation film 5 may be attached to the battery cell assembly 2 in a state upwardly positioned from the bus bars 3. Further, in the aforementioned embodiment, although the insulation film 5 is singularly provided and the plurality of bus bars 3 is affixed to this single insulation film 5, the present invention is not limited thereto, two insulation films 5 may be provided in a manner clamping and fixing the plurality of bus bars 3 therebetween. Since the surfaces of the bus bars 3 are thus covered by the insulation film 5, even if foreign objects intrude between the adjacent bus bars 3, the foreign objects are prevented from directly contacting the surface of the bus bars 3, thereby a short-circuit occurring between the adjacent bus bars 3 is prevented. Accordingly, when the surfaces of the bus bars 3 are covered by the insulation film 5, the size of the insulation portions 29, 29A in the direction of the arrow X may be made shorter than the width size of the bus bar 3.

Further, in the aforementioned embodiment, the insulation insertion hole 5b is formed through the insulation film 5, and the bus bar module 10 is lapped over the upper surface of the battery cell assembly 2 with the insulation portion 29 being inserted into the insulation insertion hole 5b, the insulation insertion hole 5b may be omitted. In such a case, the bus bar module 10 may be disposed on the upper surface of the battery cell assembly 2 by lapping the insulation film 5 over the outer surface of the insulation portion 29 in a longitudinal direction (in the direction of the arrow Y).

Further, in the aforementioned embodiment, although the insulation film 5 is configured with a synthetic resin having an adhesion property (the adhesion layer), the present invention is not limited thereto, and the insulation film may not be configured with a synthetic resin having an adhesion property. In such a case, the adhesion layer may be formed on one surface or both surfaces of the insulation film.

Further, the aforementioned embodiments merely indicates a representative embodiments of the present invention, the present invention is not limited to these embodiments. That is, the present invention may be implemented as any modifications within the gist of the present invention.

REFERENCE SIGNS LIST 1 power supply apparatus
3 bus bar 5 insulation film
20 positive electrode (terminal)
21 negative electrode (terminal)
22 battery cell
23 fixed frame (resin frame)

The invention claimed is:

1. A power supply apparatus comprising:
a plurality of battery cells in which positive electrodes and negative electrodes are provided alternately and inversely with each other;
a plurality of bus bars arranged in a straight line so as to series-connect the plurality of battery cells;
a sheet-like insulation film disposed on at least one surface side of the plurality of bus bars; and
a resin frame for fixing the plurality of battery cells,
wherein an insulation portion for insulating adjacent battery cells from each other is provided on the insulation film, wherein
the insulation portion provided in the insulation film is a part of the insulation film, and the insulation portion is formed in a plate-like shape between adjacent bus bars by the insulation film being folded.

2. The power supply apparatus according to claim 1, wherein
a columnar terminal is provided in each of the battery cells, and
a tip of the insulation portion in the standing direction is positioned higher than a top portion of the terminal, and a width size of the insulation portion in a direction intersecting with an arrangement direction of the bus bars is formed greater than an external diameter size of the bus bar.

3. The power supply apparatus according to claim 1, wherein the insulation film is configured with a stretchable synthetic resin.

4. The power supply apparatus according to claim 2, wherein the insulation film is configured with a stretchable synthetic resin.

5. The power supply apparatus according to claim 1, wherein the plurality of bus bars is affixed to the insulation film via an adhesion layer.

6. The power supply apparatus according to claim 2, wherein the plurality of bus bars is affixed to the insulation film via an adhesion layer.

7. The power supply apparatus according to claim 3, wherein the plurality of bus bars is affixed to the insulation film via an adhesion layer.

8. The power supply apparatus according to claim 4, wherein the plurality of bus bars is affixed to the insulation film via an adhesion layer.

9. The power supply apparatus according to claim 1, wherein the insulation portion is positioned to extend in a direction perpendicular to the arrangement of the bus bars past an end of the bus bars.

* * * * *